Jan. 23, 1951 A. JORDANOFF ET AL 2,539,139

TELEPHONE SYSTEM FOR AUTOMATIC ANSWERING, RECORDING MESSAGES AND RECORDING NORMAL CONVERSATIONS

Filed July 14, 1949 3 Sheets-Sheet 1

INVENTORS
ASSEN JORDANOFF
NORMAN ROBIN
BY
Kenyon & Kenyon
ATTORNEYS

Jan. 23, 1951

A. JORDANOFF ET AL 2,539,139

TELEPHONE SYSTEM FOR AUTOMATIC ANSWERING, RECORDING MESSAGES AND RECORDING NORMAL CONVERSATIONS

Filed July 14, 1949

3 Sheets-Sheet 2

INVENTORS
ASSEN JORDANOFF
NORMAN ROBIN
BY
Kenyon & Kenyon
ATTORNEYS

Jan. 23, 1951 A. JORDANOFF ET AL 2,539,139

TELEPHONE SYSTEM FOR AUTOMATIC ANSWERING, RECORDING MESSAGES AND RECORDING NORMAL CONVERSATIONS

Filed July 14, 1949 3 Sheets-Sheet 3

INVENTORS
ASSEN JORDANOFF
NORMAN ROBIN
BY Kenyon & Kenyon
ATTORNEYS

Patented Jan. 23, 1951

2,539,139

UNITED STATES PATENT OFFICE 2,539,139

TELEPHONE SYSTEM FOR AUTOMATIC ANSWERING, RECORDING MESSAGES, AND RECORDING NORMAL CONVERSATIONS

Assen Jordanoff and Norman Robin, New York, N. Y., assignors to Jordaphone Corporation of America, New York, N. Y., a corporation of New York Application July 14, 1949, Serial No. 104,744

24 Claims. (Cl. 179—6)

The present invention has for its principal object the provision of an improved multi-purpose system capable of performing a plurality of useful functions in connection with telephone message transmission, reception, and recordation—particularly the automatic answering of an incoming call and recording for subsequent repetition of callers' messages in the absence of a receiving party who might otherwise answer the telephone and hear the message in the conventional manner. To that end the invention contemplates particularly the provision of structurally and operationally simple means for automatically operating a telephone instrument to establish contact with a caller upon receipt of the conventional signal announcing an incoming call, for transmitting to the caller a prerecorded message advising him of the would be receiving party's absence and that any message which he cares to leave will be recorded, and for automatically recording such a message of a predeterminable time limit. It contemplates further the provision of means whereby the would be receiving party may later repeat or "play back" the recorded message. Additionally, it contemplates the provision of simplified means permitting the conversion of the system to a condition in which it may record both sides of a normal two-way telephone conversation when the would be receiving party is actually present and capable of answering in the normal manner. Still further, means are provided whereby the recording elements of the system may be employed to record any other speech or sound apart from those transmitted over a telephone line and while it is completely out of operation.

Figure 1:
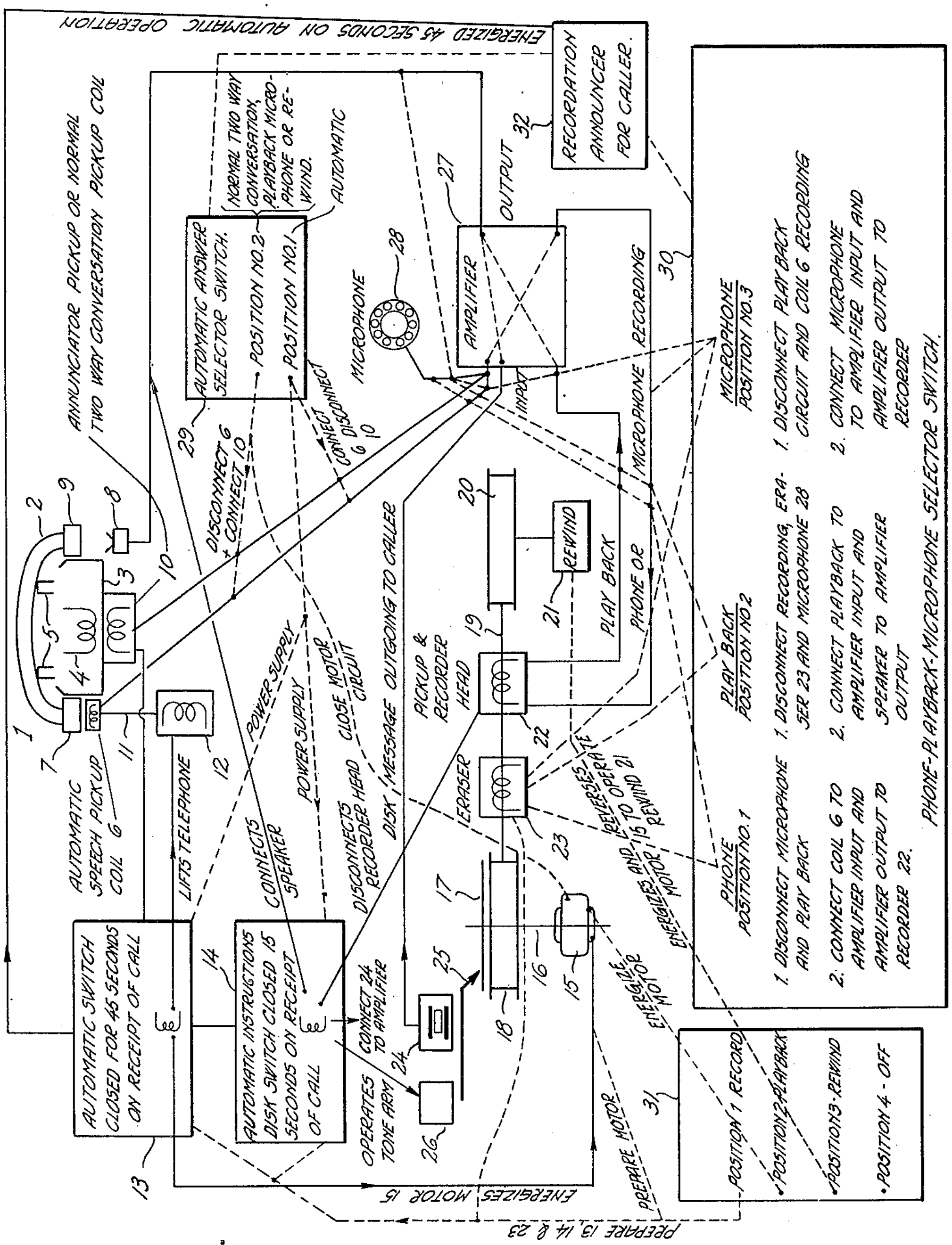
Figure 2A:
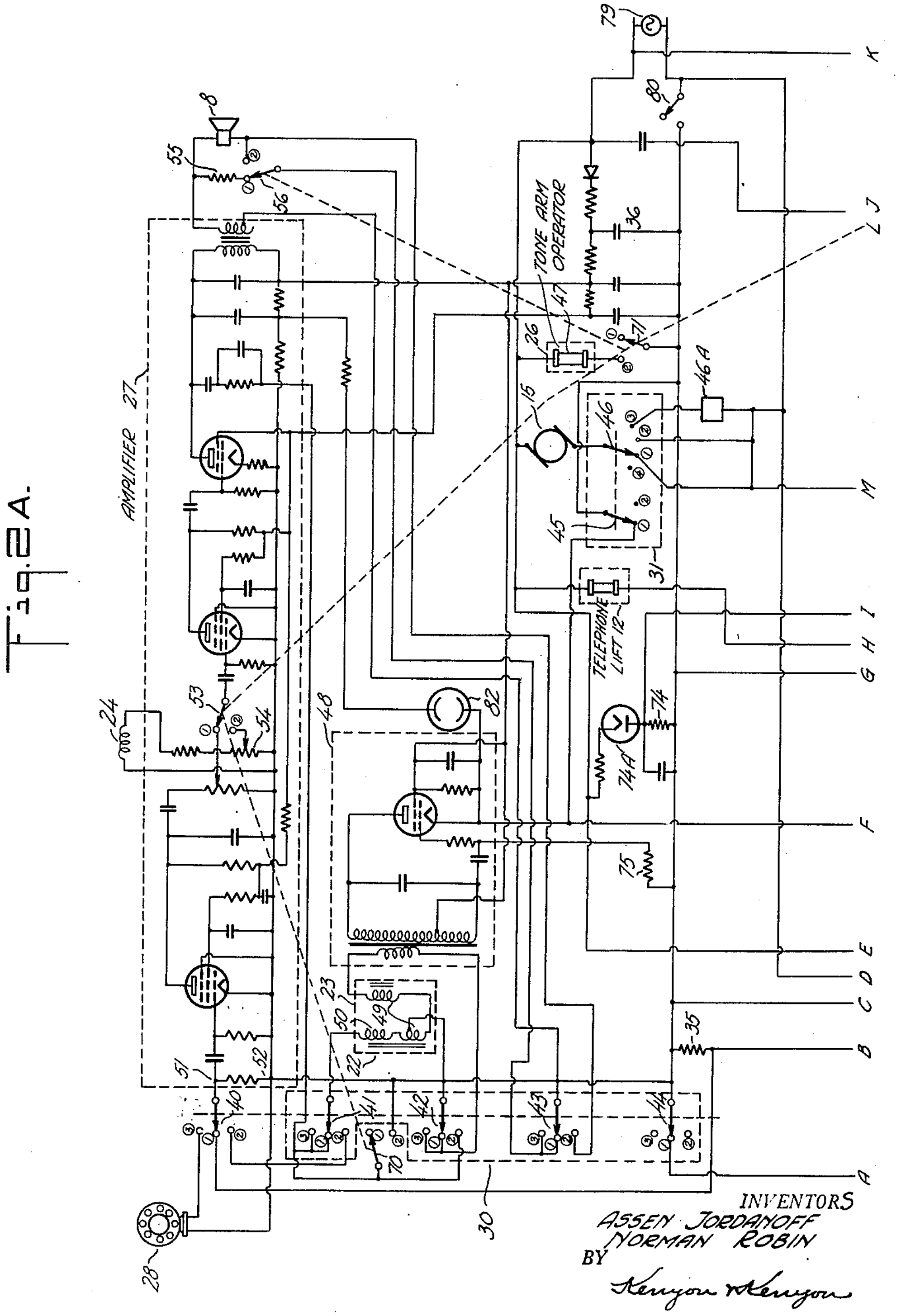
Figure 2B:
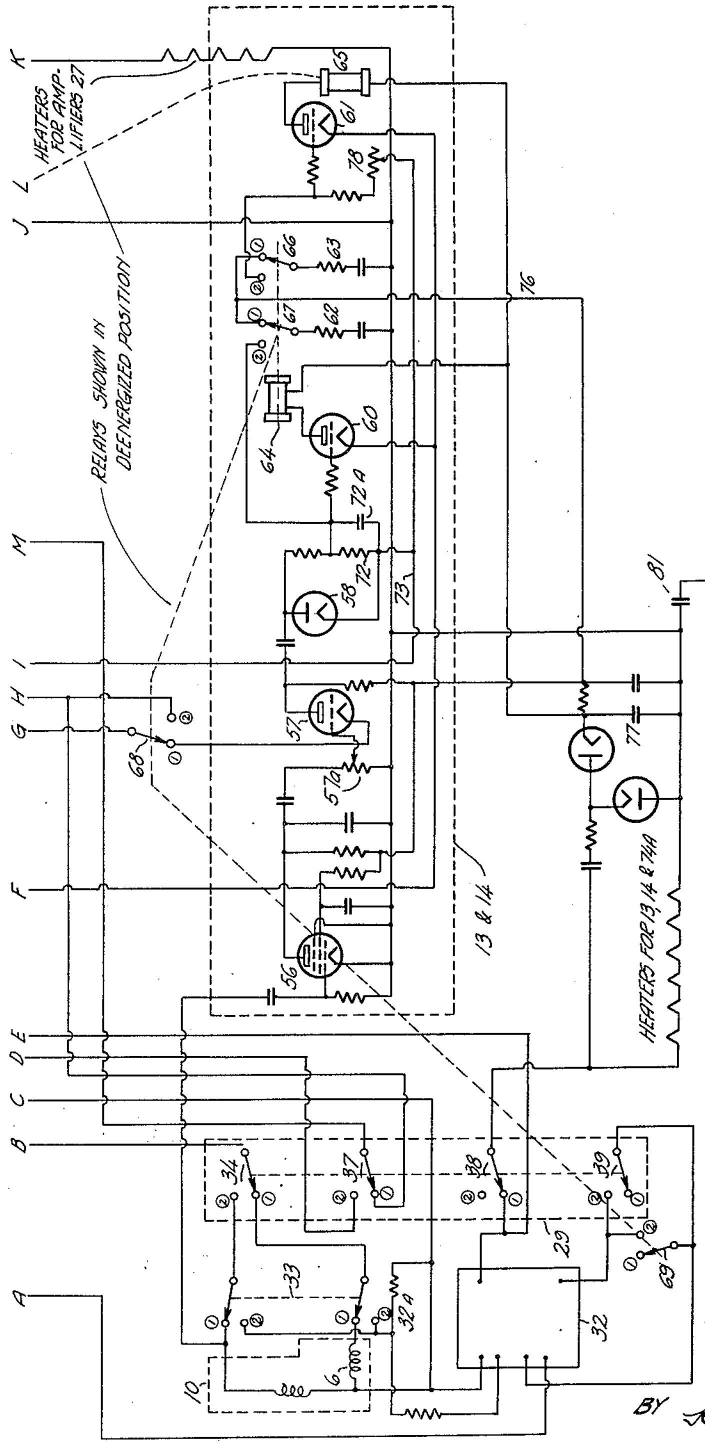

The features of the invention upon which patent protection is sought are set forth in the appended claims. The invention itself together with further objects and the many advantages thereof will best be understood by reference to the following specification of one illustrative embodiment thereof which will be better visualized with the aid of the accompanying drawings in which:

Fig. 1 represents a schematic layout of that embodiment for the purpose of permitting ready visualization of the functions of the principal elements and their inter-relations; while, Figs. 2A and 2B represent one illustrative detail layout of various circuits and elements which will implement the objects of the invention and the functional desiderata indicated by the Fig. 1 together with further circuits and elements in the nature of auxiliaries refining the performance of the system.

THE SYSTEM IN GENERAL

Referring now to the Fig. 1, the system there outlined may be viewed as centered around a telephone instrument 1, preferably of the conventional type in which a unitary receiver-transmitter 2 rests on a standard 3 having therein a coil 4 of an annunciator or bell which normally announces an incoming call, and the circuit opening and closing members 5 which establish a conversation circuit when the instrument is lifted from the standard in the usual manner and disestablish it when the instrument rests on members 5. Associated with the instrument just described there have been provided means such as a coil 6 which may be termed the "automatic speech pick-up coil," inductively or otherwise related to conventional elements in a receiver portion or earpiece 7 for picking up a signal corresponding to the caller's voice; means such as loudspeaker 8 positioned adjacent a transmitter portion or mouthpiece 9 for transmitting a prerecorded message to the caller or for playing back a caller's message or other recordings; and means for deriving a signal from the conventional device announcing an incoming call, such as the inductive coil 10 which may be inductively related to the coil 4. Coil 10 may also represent a pick-up coil for picking up normal two-way conversations as hereinafter explained. The pick-up coil 6 may be mounted on a reciprocating rod 11 operated by an electromagnetic solenoid-plunger device 12 positioned at its lower end in such manner that upon energization of the device 12 the pick-up coil 6 will move upward into contact with the earpiece 7 and thereafter raise it and the main body of the transmitter-receiver sufficiently to permit the closing of the telephone circuit through the members 5 to establish a conversation circuit in the usual manner. Suitable mechanisms for performing this latter lifting function are described and claimed in a copending application, Serial No. 104,745, filed by Assen Jordanoff and Norman Robin concurrently herewith and assigned to the same assignee as the present invention.

For the performance of the functions presently to be described, there may be provided the following elements:

Two time-delay control or switching means 13 and 14 are connected to the coil 10 in such manner that, upon receipt of a signal announcing an incoming call, the first switch 13 will function in a time-delay manner to set and maintain in operation the device 12 lifting the telephone transmitter-receiver 2, and a motor 15 driving sound recording and reproducing mechanisms to be described; and the second switch 14 will function similarly in a time-delay manner simultaneously to set and maintain in operation means which will convey a pre-recorded message to the caller. The means 13 will remain in operation for a predetermined time, for example, about forty-five seconds, during which the caller will have opportunity to hear the pre-recorded message and then record a message of his own to be heard by the would be receiving party upon his return. The second means 14 will function similarly for a shorter period, for example, fifteen seconds, sufficient only to permit the sending of the pre-recorded message to the caller.

In the sound recording and reproducing mechanisms there are provided a turntable mechanism 16 driven by motor 15 and adapted to carry both a disk 17 having a pre-recorded message thereon and a spool 18 adapted to contain a magnetizable wire 19 for recording an incoming message or for other purposes to be described hereinafter. The wire 19 is initially wound onto a second spool 20 in the usual manner and that may be provided with the conventional rewind mechanism 21 which may be likewise driven by motor 15 by means not shown. For the purpose of recordation or play-back of messages recorded on the wire, the usual pick-up and recording head 22 may be provided and, additionally, the conventional high frequency (30 kilocycles) erasing mechanism 23 which conditions the wire for receipt of a recording in the usual manner. Pick-up of the pre-recorded message on disk 17 may be accomplished by the conventional crystal pick-up or other mechanism 24 functioning with the usual tone arm 25. The device 26 comprises a mechanism which will drop the pick-up arm 25 to the disk 17 upon initiation of operation by coil 10 through means 14 and at the end of the predetermined time for transmission of the pre-recorded message, e. g., fifteen seconds, will raise the arm 25 and return it to its initial position so that it may be in a condition to repeat the message to subsequent callers. Suitable mechanisms for performing this arm moving function are described and claimed in a copending application, Serial No. 104,745, filed concurrently herewith by Norman Robin and assigned to the same assignee as the present invention.

For the purpose of transmitting the various messages from the telephone instrument to the sound recording and reproducing mechanisms, or from the latter to speaker 8 there may be provided a conventional sound amplifier 27 connected as shown. A microphone 28 attached to the input of the amplifier may be provided for use in connection with conversations or sounds originating other than in the telephone lines.

In order to permit the operator at the local station to set the system for the automatic answering and recording of messages in his absence, or for the performance of its other functions (recording of normal two-way telephone conversations during his presence, play-back, rewind, or microphone recording), suitable two position selector switching means 29 may be provided which will function in the manner to be indicated below. Further, in order to permit that operator to set the system either to record automatic or normal telephone messages, to play back a recorded message, or, to function as a recorder of speech or sound through the microphone 28 when totally unassociated with the telephone conversation circuit, there may also be provided suitable three-position selector switching means 30 which will function in the manner also to be described. Winding of wire 19 during recording or play back, or rewinding may be provided by suitable manually operable switching means 31 so arranged that only in its position No. 1 can means 13 and 14 and eraser 32 be energized, the motor 15 being energized as indicated in the respective positions. Position 1 of switch 31 "prepares" motor 15 for automatic operation when switch 29 is in position 1; when switch 29 is in position 2, position 1 of switch 31 "energizes" motor 15. Conventional means 32 for transmitting to the caller a signal advising him that his conversation is being recorded may also be provided.

For simplicity of illustration, the functions only and not the completed circuits of these various switching means are shown schematically by way of the indicated dotted lines. Similarly, for the other elements, the functions only are indicated by the full lines. The full circuit connections will be understood from a consideration of Fig. 2.

*Automatic operation to answer and record incoming messages in receiving party's absence*

In order to illustrate the functioning of the system for the purpose indicated in the would be receiving party's absence, assume that the telephone receiver-transmitter 2 is resting in its normal position on the standard 3 in which the telephone circuits are completely inactive. The would be receiving party will previously have set the selector switches 29 and 30 and means 31 on their positions No. 1 in which condition the system will be ready to receive an incoming call automatically by making the pre-recorded announcement to the caller and prepared to record his message. This condition results from the fact that means 31 will have connected means 13, 14 and motor 15 in circuit ready for energization by other elements to be indicated; and selector switch 29 will have partially connected the coil 6 to and disconnected coil 10 from the input of the amplifier 27 (coil 10 is also used for pick-up in recording normal conversations), energized various control circuits such as by applying power to means 13 and 14, and prepared the circuits of motor 15 and device 12 for energization of both of them upon operation of means 13. Similarly, the selector switch 30 will have disconnected the microphone 28 and the playback circuit (hereinafter sometimes called the reproduction circuit) at the same time that it completed connection of the coil 6 to the amplifier input and connected the amplifier output to the recorder head 22 to establish a circuit for the automatic recording of the caller's message (hereinafter sometimes called the reception circuit). Except for rotation of turntable 16 to move wire 19, the system is now in a condition to record sound signals induced in coil 6 when transmitter-receiver 2 is lifted although there will be a temporary interruption of that condition for the mentioned period (fifteen seconds) of transmission of the pre-recorded message on disk 17 as will be described.

Suppose now that an incoming call is received and announced by currents in the bell coil 4. Corresponding currents will thereupon be induced in the coil 10 to initiate operation of the time-delay switching means 13 and begin the running of the first-mentioned predetermined period, e. g., forty-five seconds. The same action of the coil 10 will simultaneously initiate the action of the time-delay switching means 14 whereby the other predetermined time period, e. g., fifteen seconds, will begin simultaneously with that of the means 13. Initiation of the operation of the means 13 will cause it to perform three functions. First, it will lift the transmitter-receiver 2 through the electromagnetic device 12 thereby closing the telephone circuit for message transmission either way. Secondly, it will initiate rotation of the disk 17 and the wire collecting spool 18 by energizing the motor 15. Lastly, it will close the circuit of means 32.

Such action would complete the conditioning of the system to record the caller's voice except for the fact that the action of the means 14 will prevent such recordation for the fifteen second interval in which it is operative. The reasons are as follows: Upon initiation, the means 14 will disconnect the recorder head so that neither the caller's voice nor the local recorded message will be recorded during this fifteen second interval. After the end of that interval the recorder head will again be connected for the recording of the caller's voice. Also, at the initiation of this fifteen second interval the means 14 will perform the following three functions: First, it will connect the speaker 8 with the amplifier output. Secondly, it will connect the output coil 24 associated with arm 25 to the amplifier input. By these two steps the system is placed in condition to transmit the message on the local record of disk 17 to the speaker 8 and thence to the caller over a circuit hereinafter sometimes called the transmission circuit. Third, and to complete the functioning, the means 14 will operate the device 26 to drop the arm 25 to the disk 17 at the beginning of the fifteen second interval. At the end of the interval, the device 26 will pick the arm 25 up from the disk and return it to its initial position for subsequent reiteration of the pre-recorded message should another call later arrive. At the same time, it will break the circuit of the pick-up coil 24, disconnect speaker 8 and reconnect the recorder head 22 whereupon the caller may convey his message through the amplifier to the recording head (over the reception circuit) and yet that message will not be repeated back to him through the speaker.

It will be understood that, upon cessation of the forty-five second interval, the means 13 will have returned the transmitter-receiver 2 to its normal position opening the telephone circuit and deenergizing the motor 15. It will, of course, be apparent that, should subsequent calls arrive, they too will initiate the same cycle of announcement and recordation and thus there may be received any number of calls limited only by the amount of wire on the spool 20 available for recording.

*Play-back by the local would be receiving party*

Should the would be receiving party return to the local station and desire to listen to any messages left during his absence, he may turn the selector switches 29 and 30 and means 31, to the positions No. 2 which will connect the reproduction or play-back circuit (recorder head to the amplifier input and the speaker to the amplifier output) at the same time that it disconnects eraser 23, and the reception circuit (the amplifier output from the recorder head and the coil 6 from the amplifier input) and the microphone 28, whereupon, having first re-wound the wire 19 by operating means 31 to position No. 3 (with switch 29 on position No. 2), he may proceed to listen to all messages recorded on it.

*Recordation of normal two-way conversation*

Of course, if the would be receiver is already present when the incoming call arrives he may desire rather to answer directly in conventional manner without use of the automatic answer system just described. At the same time, he may wish that the two-way conversation of both the caller and himself be recorded. This may be accomplished by turning switch 30 and means 31 to positions No. 1, and the selector switch 29 to the position No. 2 which, in effect, disconnects the coil 6 and connects the coil 10 to the amplifier input, and at the same time connects the amplifier output to the recorder head to establish a circuit for recording both sides of the conversation through induction in coil 10 (the circuit being hereinafter sometimes called the recording circuit). The circuit of motor 15 is now closed by switch means 31 instead of means 13 which is deenergized. In this situation both sides of the conversation may be recorded without energizing any other part of the automatic answering circuit which has been disconnected by switch 29. The coil 10 is used in preference to the message pick-up coil 6 for several reasons. First, the instrument being now in the user's hand, it is inconvenient to use coil 6. Second, coil 10 will more readily pick up both sides of a conversation. Thirdly, it is found that coil 10 may operate in its position underneath the instrument 1 without interference from any stray fields from the device 12 or other electromagnetic elements of the circuit because they are deenergizd. In contrast, the coil 10, during the automatic operation, cannot normally operate in that position as a voice pick-up coil because it is in closer proximity to the device 12 and thereby would tend to pick up stray fields as from device 12 which coil 6 cannot pick up so long as it is in a relatively elevated position lifting the transmitter-receiver 2.

*Microphone operation*

Should, for any reason, the local operator desire to record speech or any other sound totally unassociated with the telephone system and without utilizing any of the automatic apparatus thus far described, he may turn the means 31 to position No. 1, switch 29 to position No. 2 and selector switch 30 to its position No. 3 in which case the microphone 28 alone is connected to the amplifier input and the recorder 22 alone connected to the amplifier output to set up a circuit hereinafter sometimes called the microphone circuit. The circuit of motor 15 is closed by switch 29 and means 31, and eraser 23 energized through means 31. After making any desired recording he may then play it back by turning the selector switch 30 and means 31 back to positions No. 2 and operating as previously described.

*Auxiliary operations*

Details of certain auxiliary elements also controlled by means 29 and 30 have been omitted in the functional layout of Fig. 1 in the interest of clarity of exposition. These however will be described in connection with Fig. 2. For one example, it may be mentioned that there may be provided a switching connection to cause means 32 to be operated for the predetermined 45 second period by means 13, by switches 29 and 30 during normal two-way conversation recording, and for disconnecting it entirely when not desired—all as will be explained in more detail hereinafter.

*A detailed circuit*

Referring now to Fig. 2, many of the details of circuits and elements indicated therein will already be apparent to those skilled in the art to the extent that they comprise conventional amplifier, oscillator, power supply circuits, etc., employing conventional electron discharge devices, resistors, relays, switches, etc., all of which are arranged in the various claimed combinations to perform the functions already outlined. The functional counterparts of many of the elements illustrated in the Fig. 1 are illustrated in the Fig. 2 by the dotted outlines of like numerical designations. For convenience of illustration such elements as the telephone instrument 1, the recording and play-back sound recording and reproducing mechanisms, the means 26 for the arm 25, and the mechanical devices for lifting the transmitter-receiver 2, are not shown but, rather, only the principal elements which cause them to function. The manner of connecting these omitted elements will, of course, be readily understood by those skilled in the art.

The coils 6 and 10 corresponding to those of counterpart number in Fig. 1 are shown on the lower left-hand side of the Fig. 2 as comprising two coils the latter of which is permanently connected to the input of the amplifier-time-delay circuit, at the right thereof, comprising the means 13—14 and both of which may be connected to selector switch 29 through a two-gang, two-position switch 33, the function of which will be described later and which is shown in its normal position for automatic or normal conversation recording. Through the upper switch 34 of the switch 29 and the resistor 35 connected to the low potential side of the power source 36, any signals imposed upon either coil 6 or 10 may be transmitted to the input of the amplifier 27 through the connections shown. The selector switch 29 is shown as comprising a four-gang, two-position mechanical switch including individual switches 34, 37, 38 and 39 operated by a suitable arm represented by the dotted line. As the numerical designations "1" and "2" adjacent its contacts indicate, it is shown in the "automatic" position corresponding to the position No. 1 of the Fig. 1, i. e., in a position to answer and record a caller's message in accordance with the automatic answering operation heretofore described. When moved to the position indicated by the numerical designations "2" it is in the position corresponding to position No. 2 of Fig. 1, i. e., in a condition for the recording of normal two-way conversations.

The selector switch 30 comprises a five-gang, three-position switch similar to switch 29 and having individual switches 40, 41, 42, 43 and 44. It is shown in the "phone" position No. 1 of Fig. 1. The numerical designations "1," "2" and "3" indicate positions corresponding to positions Nos. 1, 2 and 3 of switch 30 in Fig. 1.

The telephone lifting device 12 and the motor control switch 46 comprising the means 31 of Fig. 1 are shown just to the right of the center of the diagram. Switch 45 providing the means for energizing means 13, 14 and eraser 23 in the position No. 1 of means 31 in Fig. 1 is ganged to switch 46 in such manner that switch 45 is closed only when 46 is on its position No. 1. The means 26 of Fig. 1 for operating the tone arm 25 are shown only as comprising a solenoid 47, also to the right of the center. This solenoid may comprise the operating element of any suitable arm operating mechanism, for example, the solenoid plunger device shown in the mentioned copending Robin application Serial No. 104,745 filed July 14, 1949.

The means for energizing the eraser 23 is shown as comprising a conventional oscillator 48 designed to oscillate, for example, at a frequency of about 30 kilocycles and coupled to a coil 49 positioned within eraser 23 in inductive relation to wire 19. A part of coil 49 is also coupled to coil 50 as shown. The recorder coil 50 of recorder head 22 is also in inductive relation to wire 19 in the usual manner.

The amplifier 27 has an input terminal 51 and a ground connection 52 as its other terminal, the ground connection being, as indicated, the low potential side of power source 36 shown at the right of the diagram. The phonograph pick-up coil 24 is shown as being connected into the input of the second amplifier stage when the switch 53 is operated as will be described later. Volume control is provided for the amplifier at the variable contact 54. The connections to the output of the amplifier include a "dummy" resistor 55 connectable as a substitute for the speaker 8 through switch 56 or switch 43. Resistor 55 has the same impedance as speaker 8 and is for the purpose of retaining proper balance in the amplifier when it is desired to disconnect the speaker.

The means 13 and 14 comprise a special amplifier having first two stages 56 and 57 of amplification and a third or rectifier stage 58 shown as a half wave rectifier of conventional type. Third and fourth stages 60 and 61, between which the time-delay, resistor-capacitor circuits 62 and 63 are positioned, are provided for the operation of suitable electromagnetic relays 64 and 65 which are normally deenergized and which, upon energization, will operate respectively the series of switches 66, 67, 68 and 69 and the series of switches 53, 56, 70 and 71 as indicated by the dotted lines. These switches are shown in the positions "1" which they assume when relays 64 and 65 are deenergized. When the relays are energized the switches will move to their positions "2." Each series of switches may be a simple four-gang, two-position switch of conventional construction biased by springs to the position "1."

The operation of this amplifier, means 13 and 15, is substantially as follows. Upon receipt of a signal announcing an incoming call from the coil 10, a rectified uni-directional voltage will be built up across the condenser 72*a* of the rectifier stage 58 with the positive side applied to the grid of stage 60. This will cause conduction in stage 60 and consequent energization of the relay 64 to draw all of the switches 66 to 69 associated therewith to the opposite position from that shown (to position "2"). Simultaneously and because of the movement of switch 66 to its position "2," a similar operation occurs for the amplifier stage 61, i. e., the imposition of a positive voltage on the grid of stage 61 by resistor-capacitor circuit 63 causes stage 61 to conduct whereby the relay 65 is energized to draw its associated switches 53, 56, 70 and 71 to their positions "2" opposite from that shown. Both of the stages 60 and 61 are normally non-conducting by virtue of a negative bias imposed upon their grids through the connection 73 which leads to the "ground" or low potential side of power source 36 through resistor 74. Rectifier 74a between the high potential side of alternating current source 79 and the upper ends of resistor 74 establishes the necessary voltage across the latter. However, the stages 60 and 61 are not energizable until their cathodes are grounded by connection to the low potential side of source 79 through the indicated connections by closure of switch 45 which occurs only when switch 46 is on its position No. 1.

The relay action just described which occurs upon the receipt of an incoming signal announcing a call will impose upon these biases and the input of the stages 60 and 61 positive voltages respectively of the forty-five second and fifteen second time durations heretofore mentioned. This action results as follows. Both of the resistor-capacitor circuits 62 and 63 normally have positive voltages imposed upon their upper ends through the connection 76 leading to a voltage doubler circuit 77 and, therefore, the condensers of circuits 62 and 63 are normally positively charged. It will be seen that upon the momentary operation of the relay 64 by a momentary impulse from coil 10 and the consequent moving of the switch 67 to its left-hand position, the voltage of the capacitor in circuit 62 will be imposed upon the input grid of the stage 60. The similar action of switch 66 will impose the voltage of the capacitor in circuit 63 on the input of stage 61 to cause energization of relay 65. The time-delay circuits 62 and 63 will cause the stages 60 and 61 to remain conducting but only so long as they retain charges sufficient for the purpose. It will be understood that the moment the switches 66 and 67 are operated to their position "2," the condensers in circuits 62 and 63 will begin to discharge at rates which are determined by the time constants of the respective resistor-capacitor circuits, and it will be further understood by those skilled in the art that the time constants may be controlled by proper selection of the values of the capacitors and the resistors to cause the stage 60 to remain conducting for the desired forty-five seconds and stage 61 for fifteen seconds. The time constant and period for stage 61 may be varied by the potentiometer 78 and a similar provision (not shown) may be made for stage 60 as will be well understood.

The sensitivity of the amplifier comprising means 13 and 14 may be adjusted to accommodate the signal strengths of different bell circuits in different instruments by means of a potentiometer 57a in the grid circuit of stage 57.

The entire circuit may be energized by any suitable means such as the alternating current power source 79 connected through an on-off switch 80 to a suitable rectifier circuit constituting the unidirectional power source 36 already mentioned. The low potential side of source 36 constitutes the "ground" mentioned herein and this is connected to a conventional chassis (not shown) by a suitable capacitor 81.

The elements indicated within block 32 comprise a conventional means for announcing to the caller the fact that his conversation is being recorded and thus correspond to the means 32 of the Fig. 1.

For affording the local operator an indication of the fact that his amplifier is in proper operation when such is desired and also for giving him some rough measure of the volume level there may be provided the signal means 82 such as a neon light of conventional form connected to the amplifier output and to the erase oscillator cathode, as shown.

With the foregoing general outline of the circuit, the manner of functioning thereof in accordance with the explanation of the Fig. 1 together with further and more detailed elements thereof will be understood from the following description of operation:

*Automatic operation to answer and record incoming messages in receiver's absence*

If the user at the local station should desire to set the system for the automatic answering and recording of incoming messages, he will close the switch 80 to the power source, move the switch 46 to the position No. 1 ("Record") thereby simultaneously closing the switch 45. Thereafter he will move both the selector switches 29 and 30 to their positions "1" as shown. By tracing the various circuits through the switch means 29, 30, 45 and 46, it will be seen as already suggested in discussing Fig. 1, that the automatic speech pick-up coil 6 is connected to the input of amplifier 27 through switches 34 and 40, the amplifier output is connected to the recording coil 50 at switch 41, the erase oscillator 48 is energized by grounding of its cathode at switch 45, the circuit of eraser coil 49 is completed at switch 42, the speaker 8 is disconnected at switch 43 and resistor 55 substituted in its place, and the power to the means 13 and 14 is connected at switch 38. The play-back and microphone circuits are disconnected from the amplifier input at switch 40. It is apparent therefore that the system is ready to record sound signals coming from coil 6 when motor 15 is energized.

Should now an incoming call be announced by the ringing of the bell by the bell coil 4, a voltage of the bell frequency, for example, about 20 cycles in the case of conventional bells, will be induced in the coil 10 and transmitted to the input of the first two amplifier stages 56 and 57 of the means 13 and 14. This will result in the development of a positive voltage through the rectifier stage 58 imposed upon the grid of the stage 60. That grid, as well as the grid of stage 61, is in the absence of a signal, normally biased negatively through the connection 73 as already indicated. Because of the momentary positive voltage originating with the bell signal, the stage 60 will be caused to conduct and the relay 64 will be energized drawing all four contacts 66 through 69 from their normal positions "1" in the absence of a signal to their positions "2." Thereupon the device 12 for lifting the telephone will be energized by switch 68, the means 32 circuit will be energized by switch 69, and both of the resistor-capacitor circuits 62 and 63, previously charged by the voltage doubler 77, will be connected to the grids of the stages 60 and 62 respectively. Because of the long time constant of the resistor-capacitor circuit 62, the stage 60 will remain conducting for about forty-five seconds for the purpose already described, thereby maintaining the relay 64 in an energized state for that period. Similarly, the resistor-capacitor circuit 63 will maintain the stage 61 in a conducting period for a period of about fifteen seconds for the purposes already described. The initial energization of the stage 60 will cause energization of the relay 65 simultaneously with the energization of the relay 64 but, of course, 65 will remain energized for a shorter time i. e. only fifteen seconds.

While 65 is energized its four switches. 53, 56, 70 and 71, will be drawn from their normal positions "1" shown to their positions "2" thus connecting the phonograph record input 24 to the input of the second stage of amplifier 27 at switch 53, connecting the speaker 8 in circuit with the amplifier output at switch 56 and, at the same time, energizing the tone arm operator means 26 at switch 71. Switch 70 grounds the recorder coil 50 for the fifteen second period to prevent recordation of the pre-recorded message on the wire 19. In order to prevent interference with the further operation by stray signals coming in to the amplifier means 13 and 14 from the bell circuit during the predetermined periods of fifteen and forty-five seconds, the stage 57 is rendered non-conducting by the opening of its cathode circuit by the switch 68.

At this stage of operation, the system is in a position to transmit to the caller whatever message has been pre-recorded on the phonograph record 17 through the input coil 24. The energization of the device 26 by the switch 71 of relay 65 will have dropped the tone arm 25 to the record at its beginning for that purpose. The message on the record will, of course, be transmitted to speaker 8 and thence through the telephone earpiece 9 to the caller. Recording wire 19 is being wound on to the spool 18 at this time, however, neither the caller's voice nor the message sent to him from the disk 17 will be recorded on the wire because the switch 70 is on its position 2 during this fifteen second interval. By grounding the upper end of recorder coil 22, i. e., by connecting it to the lower side of the power input line, the switch 70 prevents any voice currents from going into the recorder coil 22.

At the end of the fifteen second interval the relay 65 will be deenergized thus disconnecting the coil 24 from the amplifier at switch 53, disconnecting the speaker 8 and substituting the "dummy" resistor 55 in its place, returning the switch 70 to its position 1 to remove the ground connection from the recorder coil, and deenergizing the tone arm operating device 26 at switch 71 whereupon device 26 returns the tone arm to its initial position, as already indicated. The system is thereupon placed in condition to receive and record the caller's voice and message in the following manner:

Through the selector switches 29 and 30, the automatic speech pick-up coil 6 will have been connected to the input of amplifier 27 at the switches 34 and 40. The switch 45 will have grounded the cathode of the erase oscillator 48 so that it is in oscillation and already conditioning the wire for receipt of the caller's voice. The switch 38 will have energized the necessary control circuits of the means 13 and 14. The switches 69 and 44 will have energized the means 32 to advise the caller that he is being recorded, but only when means 32 is in use as hereinafter indicated. The output of the amplifier 27 will have been connected to the recorder coil through the switch 41 and, at the same time, the circuit of the "dummy" resistor 55 will have been completed at switch 43. The eraser coil 49 will have been connected to the circuit by switch 42.

With this situation the caller's voice will be automatically recorded on the wire. At the same time, because the speaker is out of circuit, his voice will not be repeated to him over the telephone line. At the termination of the forty-five second interval, the relay 64 will be deenergized and the entire system will have been returned to its original condition and thus prepared for the receipt of further calls.

*Play-back by local would be receiving party*

Should the local party desire to hear any message which might have been recorded on the wire 19 in the foregoing manner he may do so by switching the selector switches 29 and 30 and switch 46 to positions No. 2 after first having rewound the wire by manipulation of the switch 46 to its position No. 3 (while switch 29 is on position No. 2). In position No. 3 an idler connection indicated schematically only as idler means 46*a* will be connected to the motor to reverse its direction for rewinding at the same time that power is supplied for rewind. With 30 and 46 on positions No. 2, the recorder coil 22 is connected to the input of the amplifier 27 through the second position of the switches 40 and 41, whereupon the recorded sound signals already on the wire will be passed through the amplifier and, since the speaker 8 is again connected in circuit by switch 43, the recorded voice may be heard by the local operator. Switch 42 grounds the amplifier recording output during play-back in order to prevent feed-back through switch stray capacity. The means 32 is disconnected at switch 44.

*Recordation of normal two-way conversation*

If the local operator should desire to record normal two-way telephone conversations without connecting any of the automatic system heretofore described, he may turn his selector switch 29 to its position No. 2, the selector switch 30 and switch 46 having been placed back on the positions No. 1. The coil 10 will now comprise an input circuit to the amplifier 27 through switches 34 and 40 and will be in a position to pick up from the transformer (Fig. 1) in the telephone standard, a signal corresponding to both sides of the conversation. The oscillator 48 will be energized by closure of switch 45, but the control circuit of the means 13 and 14 will be deenergized because switch 38 is open. The means 32 will be energized by switch 39 but only when in use as hereinafter indicated. The speaker 8 will, of course, be out of circuit but its place will be taken by the "dummy" resistor 55 through switch 43. The recorder coil 22 will, of course, be connected to the amplifier output by switch 41. Normal recording of the two sides of the conversation may therefore take place without the energization of the means 13 and 14 nor the coil 12 nor the tone arm operator 26.

If the local user chooses to repeat this two-way conversation he may simply turn his selector switch 30 and switch 46 back to positions No. 2 and operate as previously described for "play-back."

*Microphone operation*

Should the local operator desire to record sound originating only at his local station and with all the telephone circuits and control circuits completely disconnected, he may turn his switch 46 to position No. 1. Selector switch 29 to position No. 2 and selector switch 30 to the position No. 3 in which case the microphone 28 is connected directly to the input of amplifier 27, the speaker 8 is taken out of circuit and the resistor 55 substituted at switch 43, the amplifier output is connected to the recorder at switch 41, the erase oscillator is started by the switch 45 near the motor 15 and the whole system is thereby in a position to record. Play-back is accomplished as before by turning the selector switch 30 and switch 46 to positions No. 2 after rewinding by temporary use of position No. 3 of switch 46.

*Optional use of means 32*

It will be understood that means 32 includes means for electrically exchanging signals by direct connection with the telephone circuit. If it be desired to dispense with the use of means 32, switch 33 may be placed in its position No. 1, in which the signal output from means 32 is disconnected from amplifier 27. However, if it be desired to use means 32, its direct connection to the telephone line may also be used in the stead of coil 6 as a means of picking up speech signals. In that situation, switch 33 may be placed on its position No. 2 and the means 32 will not only be in operation to convey its warning of recordation to the caller but the caller's speech signals will be transmitted through means 32 to voltage divider circuit 32*a* for transmission to amplifier 27 via switches 24 and 40.

*General*

It is to be noted that the system includes safety features precluding improper or damaging operation by operator inadvertence. Thus—since the cathodes of oscillator 58 and stages 60 and 61 of means 13 and 14 are grounded only when the means 31 (switch 46) is in "Record" position No. 1 (switch 45 is ganged to switch 46) relays 64 and 65 and oscillator 48 cannot function in "Play-back" or "Rewind." Therefore, there is no danger that an incoming call might operate the system during "Play-back" or "Rewind," nor can oscillator 48 interfere during these times by erasing the recording or in any other way. Also since the means 13 and 14 are deenergized by switch 29 during microphone recording an incoming call cannot interfere then.

While there has been shown and described but one embodiment of the invention it will be understood by those skilled in the art that numerous changes and modifications may be made therein without departing from the true spirit and scope of the invention as defined in the appended claims.

What is claimed is:

1. A system adapted to operate a telephone instrument of the type including a sound signal receiver-transmitter unit, a circuit controller for normally disestablishing a telephone circuit by the weight of said unit and establishing said circuit when said unit is raised, and an annunciator of calls received, said system comprising a reception circuit for receiving sound signals from said receiver, a transmission circuit for transmitting sound signals to said transmitter, first means operable in response to a signal received from said annunciator for raising said unit to operate said circuit controller to establish said telephone and reception circuits for a predetermined period of time, second means operable in response to a signal received from said annunciator for establishing said transmission circuit for a second predetermined period of time, phonograph means for generating and transmitting sound signals through said transmission circuit and transmitter to said telephone circuit during said second predetermined period of time, and second phonograph means for receiving and recording sound signals from said telephone circuit through said receiver and reception circuit during said first predetermined period of time.

2. A system as in claim 1 including means operated by said second means for rendering said second phonograph means inoperative during said second predetermined period.

3. A system as in claim 1 including sound translation means whereby said sound signals recorded by said second phonograph means may be translated into sound, and switching means for rendering said system operable to record sound signals by said second phonograph means or to translate sound signals so recorded by said sound translation means.

4. A system as in claim 1 including a recording circuit for interconnecting said instrument and said second phonograph means for recording sound signals transmitted in either direction over said telephone circuit, and switching means for rendering said system operable to record on said second phonograph means sound signals received over said reception circuit or transmitted over said telephone circuit to said recording circuit.

5. A system as in claim 1 including a sound pickup device for translating sounds unassociated with said instrument and switch means for connecting said device to said second phonograph means while rendering said transmission and reception circuits inoperative.

6. A system adapted to operate a telephone instrument of the type including a sound signal receiver and a sound signal transmitter, a circuit controller for establishing and disestablishing a telephone circuit, and an annunciator of calls received, said system comprising a device for operating said controller, a caller's message responsive device for deriving incoming sound signals from said receiver, an annunciator responsive device for deriving from said annunciator a signal upon announcement of an incoming call, a local message device for transmitting outgoing sound signals to said transmitter and for reproducing recorded sound signals, a sound signal amplifier having an input and an output, first phonograph means for reproducing pre-recorded outgoing sound signals, second phonograph means for recording and reproducing incoming sound signals, a reception circuit for connecting said caller's message device to said amplifier input and said amplifier output to said second phonograph means for recording incoming sound signals from said receiver, a transmission circuit for connecting said local message device to said amplifier output and said amplifier input to said first phonograph means for transmitting pre-recorded outgoing sound signals to said local message device for transmission to said transmitter, a reproduction circuit for connecting said second phonograph means to said amplifier input and said amplifier output to said local message device for local reproduction of signals recorded on said second phonograph means; first control means operable for a first predetermined period of time in response to a signal received from said annunciator responsive device and connectable in circuit with the latter, said second phonograph means, and said device for operating said controller for energizing said second phonograph means and operating said circuit controller to establish said telephone circuit during said first predetermined period of time; and second control means operable for a second predetermined period of time in response to a signal from said annunciator responsive device and connectable in circuit between the latter and said first phonograph means for energizing said first phonograph means and establishing said transmission circuit during said second predetermined period of time.

7. A system as in claim 6 including means operated by said second control means for rendering said second phonograph means inoperative to record sound signals during said second predetermined period.

8. A system as in claim 6 including switch means for selectively connecting said reception circuit while disconnecting said reproduction circuit, or connecting said reproduction circuit while disconnecting said reception circuit, whereby said system may be rendered selectively operative either to record an incoming message or reproduce signals recorded on said second phonograph means.

9. A system as in claim 8 in which said second phonograph means comprises a magnetizable wire recording and reproducing device, said system including eraser means for conditioning said wire during recording said switch means including means for rendering said eraser means operative during recording, but inoperative during reproduction by said second phonograph means.

10. A system as in claim 8 including a microphone and a microphone circuit for connecting said microphone to said amplifier input and said amplifier output to said second phonograph means for recording sound signals derived from said microphone, said switch means including means for selectively connecting said microphone circuit while disconnecting said reception and reproduction circuits, or disconnecting said microphone circuit while connecting one of said reception and reproduction circuits and disconnecting the other thereof.

11. A system as in claim 10 in which said second phonograph means comprises a magnetizable wire recording and reproducing device, said system including eraser means for conditioning said wire during recording, said switch means including means for rendering said eraser means operative during recording, but inoperative during reproduction by said second phonograph means.

12. A system as in claim 6 including recordation announcer means for transmitting to said telephone circuits a signal advising caller's that conversations are being recorded, means operable by said first control means for energizing said recordation announcer during said first predetermined period.

13. A system as in claim 6 in which said first phonograph means includes a tone arm and a turntable adapted to hold a pre-recorded message and a device responsive to said second control means adapted automatically to lower said tone arm to said turntable at the commencement of said second predetermined period of time and automatically to raise and return said tone arm to a predetermined starting position at the end of said second predetermined period of time whereby said pre-recorded message may be repeated occasionally.

14. A system as in claim 6 in which said first and second control means comprise an amplifier including first and second normally deenergized electron discharge devices, a first circuit for energizing said first electron discharge device for said first predetermined period of time responsive to a signal received from said annunciator device, a second circuit for energizing said second electron discharge device for said second predetermined period of time responsive to a signal received from said annunciator responsive device, and relays responsive to energization of said electron discharge devices.

15. A system adapted to operate a telephone instrument of the type including a sound signal receiver and a sound signal transmitter, a circuit controller for establishing and disestablishing a telephone circuit, and an annunciator of calls received, said system comprising a device for operating said controller, a caller's message responsive device for deriving incoming sound signals from said receiver, an annunciator responsive device for deriving from said annunciator a signal upon announcement of an incoming call, a local message device for transmitting outgoing sound signals to said transmitter and for reproducing recorded sound signals, a sound signal amplifier having an input and an output, a two-way pickup device for deriving from said instrument sound signals of a normal incoming and outgoing message exchange, first phonograph means for reproducing pre-recorded outgoing sound signals, second phonograph means for recording and reproducing incoming sound signals, a reception circuit for connecting said caller's message device to said amplifier input and said amplifier output to said second phonograph means for recording incoming sound signals from said receiver, a transmission circuit for connecting said local message device to said amplifier output and said amplifier input to said first phonograph means for transmitting pre-recorded outgoing sound signals to said local message device for transmission to said transmitter a recording circuit for connecting said two-way pickup device to said amplifier input and said amplifier output to said second phonograph means for recording sound signals of said message exchange, a reproduction circuit for connecting said second phonograph means to said amplifier input and said amplifier output to said local message device for local reproduction of signals recorded on said second phonograph means; first control means operable for a first predetermined period of time in response to a signal received from said annunciator responsive device and connectable in circuit with the latter, said second phonograph means, and said device for operating said controller for energizing said second phonograph means and operating said circuit controller to establish said telephone circuit during said first predetermined period of time; and second control means operable for a second predetermined period of time in response to a signal from said annunciator responsive device and connectable in circuit between the latter and said first phonograph means for energizing said first phonograph means and establishing said transmission circuit during said second predetermined period of time.

16. A system as in claim 15 including means operated by said second control means for rendering said second phonograph means inoperative to record sound signals during said second predetermined period.

17. A system as in claim 15 including switch means for selectively connecting one of said reception or recording circuits while disconnecting the other thereof and said reproduction circuit, or disconnecting said reception and recording circuits while connecting said reproduction circuit, whereby said system may be rendered selectively operative either to record message signals passed over said telephone circuit or reproduce signals recorded on said second phonograph means.

18. A system as in claim 17 including recordation announcer means for transmitting to said telephone circuits a signal advising caller's that conversations are being recorded, and means operable by said first control means for energizing said recordation announcer during said first predetermined period, and in which said switch means includes means for energizing said recordation announcer means while said recording circuit is connected.

19. A system as in claim 17 in which said second phonograph means comprises a magnetizable wire recording and reproducing device, said system including eraser means for conditioning said wire during recording said switch means including means for rendering said eraser means operative during recording, but inoperative during reproduction by said second phonograph means.

20. A system as in claim 17 including a microphone and a microphone circuit for connecting said microphone to said amplifier input and said amplifier output to said second phonograph means for recording sound signals derived from said microphone, said switch means including means for selectively connecting said microphone circuit while disconnecting said reception, recording and reproduction circuits, or disconnecting said microphone circuit while connecting one of said reception, recording and reproduction circuits and disconnecting the others thereof.

21. A system as in claim 20 in which said second phonograph means comprises a magnetizable wire recording and reproducing device, said system including eraser means for conditioning said wire during recording, said switch means including means for rendering said eraser means operative during recording, but inoperative during reproduction by said second phonograph means.

22. A system as in claim 15 including switch means for selectively connecting said recording circuit while disconnecting said reception circuit and first and second control means, or vice versa.

23. A system as in claim 15 in which said first phonograph means includes a tone arm and a turntable adapted to hold a pre-recorded message and a device responsive to said second control means adapted automatically to lower said tone arm to said turntable at the commencement of said second predetermined period of time and automatically to raise and return said tone arm to a predetermined starting position at the end of said second predetermined period of time whereby said pre-recorded message may be repeated occasionally.

24. A system as in claim 15 in which said first and second control means comprise an amplifier including first and second normally deenergized electron discharge devices, a first circuit for energizing said first electron discharge device for said first predetermined period of time responsive to a signal received from said annunciator device, a second circuit for energizing said second electron discharge device for said second predetermined period of time responsive to a signal received from said annunciator responsive device, and relays responsive to energization of said electron discharge devices.

ASSEN JORDANOFF.
NORMAN ROBIN.

REFERENCES CITED

The following references are of record in the file of this patent:

UNITED STATES PATENTS

| Number | Name | Date |
|---|---|---|
| 1,560,226 | Fisher | Nov. 3, 1925 |
| 1,738,551 | Zuller | Dec. 10, 1929 |
| 1,778,980 | McKeldin | Oct. 21, 1930 |
| 1,845,034 | Bickelhaupt | Feb. 16, 1932 |
| 1,993,486 | Ricchiardi | Mar. 5, 1935 |
| 2,005,788 | Keiser | June 25, 1935 |
| 2,093,675 | Henderson | Sept. 21, 1937 |
| 2,282,100 | Thompson | May 5, 1942 |
| 2,374,842 | Shively et al. | May 1, 1945 |
| 2,393,272 | Van Deventer | Jan. 22, 1946 |